United States Patent [19]

Willmott

[11] E Re. 29,525

[45] Reissued Jan. 24, 1978

[54] DIGITAL RADIO CONTROL

[75] Inventor: Colin B. Willmott, Des Plaines, Ill.

[73] Assignee: Chamberlain Manufacturing Corporation, Chicago, Ill.

[21] Appl. No.: 718,311

[22] Filed: Aug. 27, 1976

Related U.S. Patent Documents

Reissue of:

[64] Patent No.: 3,906,348
Issued: Sept. 16, 1975
Appl. No.: 389,806
Filed: Aug. 20, 1973

[51] Int. Cl.[2] ..... H04B 1/00

[52] U.S. Cl. ..... 325/37; 325/55; 325/64; 340/147 R; 340/168 R; 343/225

[58] Field of Search ..... 325/37, 39, 55, 64, 325/141, 142; 340/167 R, 167 A, 171 PF, 147 R, 147 A, 168 R, 168 B, 168 S, 365 R, 365 S; 343/225, 226, 228; 179/15 BA, 15 AN, 84 SS

[56] References Cited

U.S. PATENT DOCUMENTS

| | | | |
|---|---|---|---|
| 2,812,509 | 11/1957 | Phelps | 325/55 |
| 2,996,704 | 8/1961 | Dimond et al. | 325/142 |
| 3,175,191 | 3/1965 | Cohn et al. | 325/55 |
| 3,261,920 | 7/1966 | Aaron | 179/15 BA |
| 3,378,817 | 4/1968 | Vitt | 325/55 |
| 3,384,873 | 5/1968 | Sharma | 325/55 |
| 3,510,777 | 5/1970 | Gordon | 325/55 |
| 3,510,780 | 5/1970 | Buehrle | 325/142 |
| 3,596,181 | 7/1971 | Dowling | 325/55 |
| 3,649,756 | 3/1972 | Roberts et al. | 340/365 S |
| 3,716,836 | 2/1973 | Jacquet | 340/164 R |

*Primary Examiner*—Robert L. Griffin
*Assistant Examiner*—Jin F. Ng
*Attorney, Agent, or Firm*—Hill, Gross, Simpson, Van Santen, Steadman, Chiara & Simpson

[57] ABSTRACT

A digital radio control system comprising a transmitter and receiver wherein a plurality of two position switches may be set in a transmitter to pick a particular code which will be serially transmitted by the transmitter and in which a plurality of switches in a receiver may be set to a particular code such that if the same code is selected in the receiver as is set in the transmitter the receiver will be energized upon recognition of the code. Such transmitters and receivers are adaptable to many applications, as for example, garage door actuators; and due to the large number of possible code combinations, interference between other control units within radio frequency range will not occur.

9 Claims, 8 Drawing Figures

DIGITAL RADIO CONTROL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to transmitter and receiver coding system and in particular to a serially transmitted code which can be detected by a receiver.

2. Description of the Prior Art

Garage door actuators of the prior art have generally utilized different R.F. frequencies for closely adjacent systems. However, since the number of carrier frequencies is limited in view of the allocation of the Federal Communications Commission of a specified band of frequencies, many times the radiation from a particular garage door transmitter will energize doors belonging to others which is undesired. Thus, this results in a person energizing neighbors' garage doors inadvertently and accidently.

SUMMARY OF THE INVENTION

The present invention relates to a transmitter and receiver coding and encoding system wherein a plurality of switches establish a binary serially transmitted code at the transmitter which will energize only the particular receiver which is set to the same binary code by equivalent number of switches at the receiver. There are a number of carrier frequencies that can be used in transmitters and receivers of this type. The total number of available combinations is increased many times over that available wherein only different carrier frequencies are used to isolate the different transmitter and receiver combinations. The invention also provides that in the unlikely event that a similar transmitter and receiver are located within radio frequency range in which the same radio frequency channel and the particular binary coding has been selected, that the binary coding can be changed in the transmitter-receiver to a different coding by merely moving two position switches and thus eliminating any possible interference.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

The present invention relates to a transmitter and receiver in which a serially transmitted digital code can be established in the transmitter by setting a number of two position switches so as to transmit on a radio frequency carrier a plurality of binary pulses representative of ones or zeroes as determined by the pulse length. A receiver within radio frequency range is provided with an equal number of two position switches which may be set to a particular binary code such that a receiver set to the particular code of the transmitter will recognize the code and energize the receiver thus actuating a garage door or other device.

Figures 1, 3A, 3B, 3C, 3D:
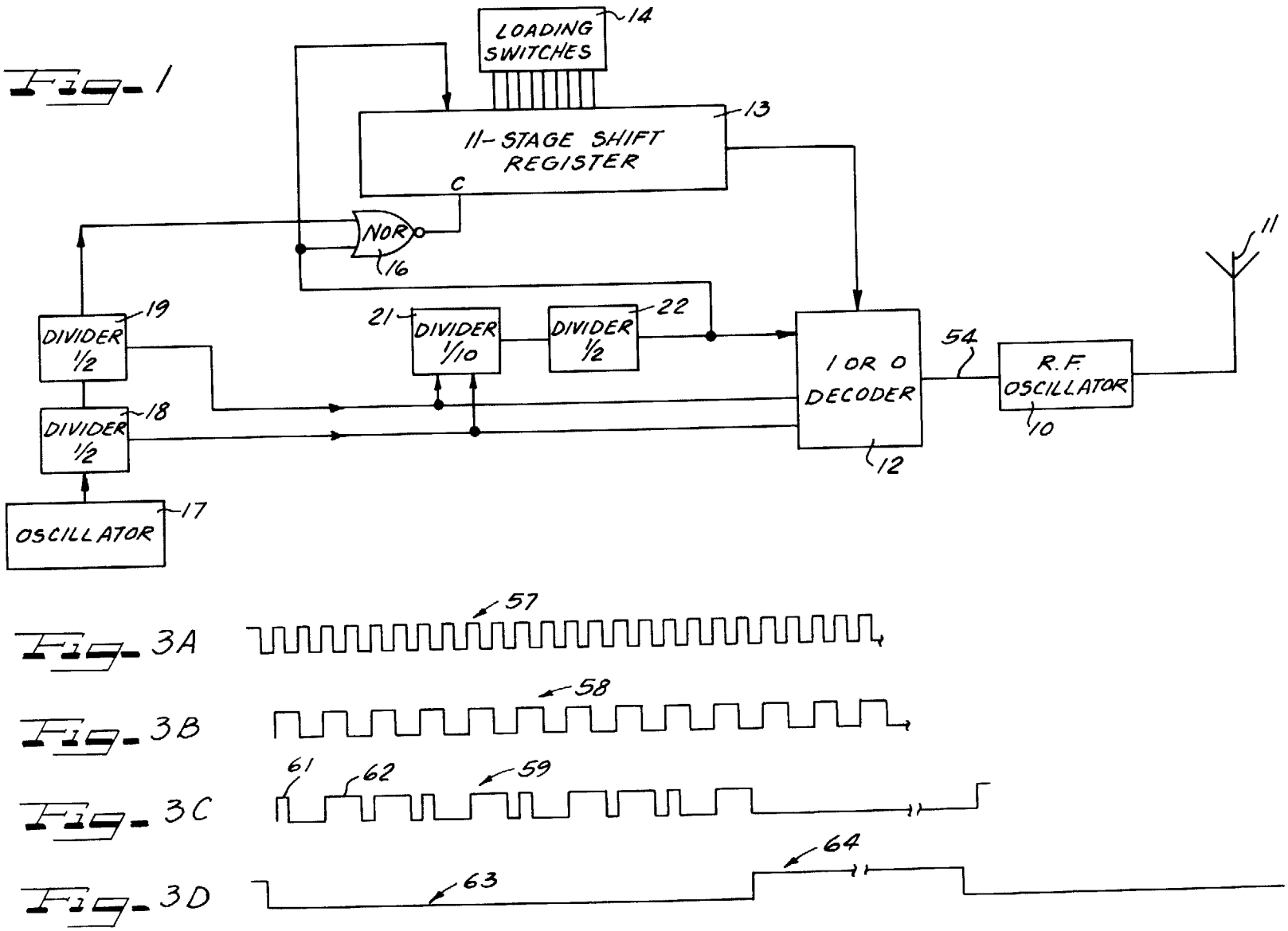
FIG. 1 is a block diagram of the transmitter of this invention.
FIGS. 3A—3D illustrates wave shapes for explanatory purposes of the invention.
Figure 2:
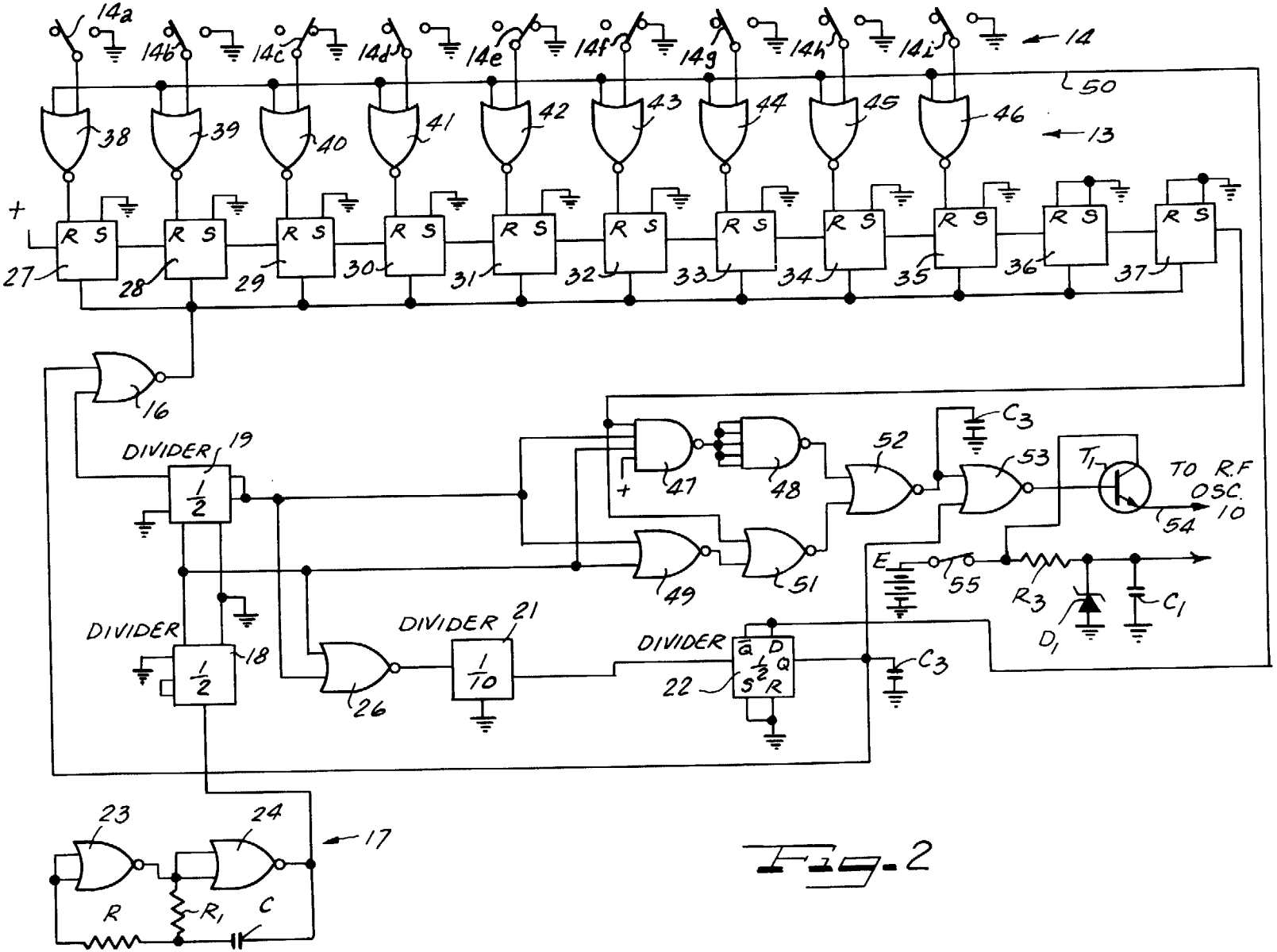
FIG. 2 is a block diagram of the transmitter encoder.

FIGS. 1 and 2 illustrate the transmitter of the invention. For example, FIG. 1 illustrates an antenna 11 which receives a input from a radio frequency oscillator 10 from a lead 54 which is connected to the output of a one or zero decoder 12. A shift register 13 supplies an input to the decoder 12. A plurality of two position switches 14 are connected to the shift register to establish a binary code. A NOR gate 16 supplies an input to the shift register 13. An oscillator 17 which might oscillate at one kilohertz, for example, supplies an output to a divider 18 which divides the oscillator output by two. The divider 18 supplies an input to the decoder 12. A dividier 19 receives the output from the divider 18 and divides it by two and supplies an output to the NOR gate 16. A divider 21 divides inputs by ten received from the dividers 18 and 19. A divider 22 receives the output of the divider 21 and divides it by two. Divider 22 supplies an input to the decoder 12 and supplies an input to the NOR gate 16 and to the shift register 13.

FIG. 2 illustrates the transmitter encoder system in greater detail. The loading switches 14 are exemplified by nine, switches 14a–i, which have two positions wherein either a positive voltage or ground potential may be selected by the switches 14. A plurality of NOR gates 38–46 are respectively connected to the switches 14a–i and also receive inputs from a Q-bar output of divider 22. An eleven-bit shift register is made up of integrated circuits 27–37 with the stages 27–35 respectively connected to the outputs of the NOR gates 38–46. A NOR gate 16 supplies inputs to the stages 27–37 and receives inputs from the divider 19 and the divider 22. The free-running oscillator 17 comprises the NOR gates 23 and 24 and are connected to the resistors $R_1$ and $R_2$ and the capacitor C. The output of NOR gate 24 is supplied to the divider 18. The output of the divider 18 is connected to the divider 19 and to NOR gate 26 and 49. The NOR gate 26 also receives an output from the divider 19. The divider 21 supplies an input to the divider 22. A NAND gate 47 receives inputs from the divider 18 and the divider 19 as well as from stage 37 of the shift register. A NAND gate 48 receives the output of the NAND gate 47 and supplies an output to a NOR gate 52. A NOR gate 51 receives an input from the NOR gate 49 and an input from the stage 37 and supplies an input to the NOR gate 52. A NOR gate 53 receives an output from a NOR gate 52 and the Q output from the divider 22. A capacitor C3 is connected between the Q output of the divider 22 ground. A transistor $T_1$ has its base connected to the output of the NOR gate 53 and its emitter is connected to lead 54 which is connected to key the RF oscillator 10. Its collector is connected to an on-off switch 55 which has its other side connected to the positive terminal of a battery E which has its other side grounded. A resistor R3 is connected to a Zener diode D1 and a capacitor C1 which have their opposite sides connected to ground.

In operation, the switches 14a–14i are set to the particular code to which the receiver will be set. The free-running oscillator 17 oscillates at one kilohertz which is divided by the dividers 18 and 19 to 500 and 250 hertz, respectively. The outputs of the dividers 18 and 18 are fed to the NOR gate 26 and into the divide by 10 divider 21 which supplies an input to the divide by two divider 22. When the dividers 21 and 22 have counted 20 pulses, the Q output of the divider 22 which is formed of an integrated circuit, for example, will inhibit the shift register clock through the NOR gate 16 and the Q bar output of the divider 22 will go to a low value thus enabling the NOR gates 38–46 through lead 50 that feed the reset lines of the shift registers. During the previous code frame, the code stream was shifted out loading all the "ones" into the register. When the dead time starts, the NOR gates 38–46 will be enabled by the low state on lead 50 from divider 22 and each gate can then reset its stage if the code switch 14a–14i is set low. The first stage is never reset since its output will always be a "one." This action reloads the register for the next code frame. In the particular code illustrated in FIG. 1, the switches 14c, 14e, and 14f are set to a low or grounded voltage and the other switches are set to a high voltage. It is to be realized that a low voltage represents "zero" and the high voltage represents "one."

As illustrated by wave shape 64, the dead time will continue for 40ms during which time the dividers 21 and 22 will have counted another 20 pulses at which time the clock 17 output will be gated into the register and the NOR loading gates 38–46 will again be disabled. The ones and zeros in the register will then be clocked out every 4ms into the decoder section comprising the NAND gates 47 and 48 and the NOR gates 49, 51, 52, and 53.

The NAND gates 47 and 48 will give a 1ms output for a one output from the register and the NOR gates 49 and 51 will give a 3ms output for a zero register output. These outputs are then or'ed together into the emitter follower T1 which then keys the RF oscillator by lead 54. As shown in FIGS. 3A–3D, wave shape 57 is the output of the divider 18 and wave shape 58 is the output of the divider 19. The output on lead 54 is illustrated in FIG. 3C comprising 1ms pulses representing ones and designated 61 in FIG. 3C and 3ms pulses designated by numeral 62 which represent zeroes. FIG. 3D illustrates the 40ms period 63 during which the pulses are supplied through the lead 54 to key the RF oscillator 10 and during which time they are radiated and the pulse 64 represents the dead time during which time the shift register is loaded.

Figure 4:
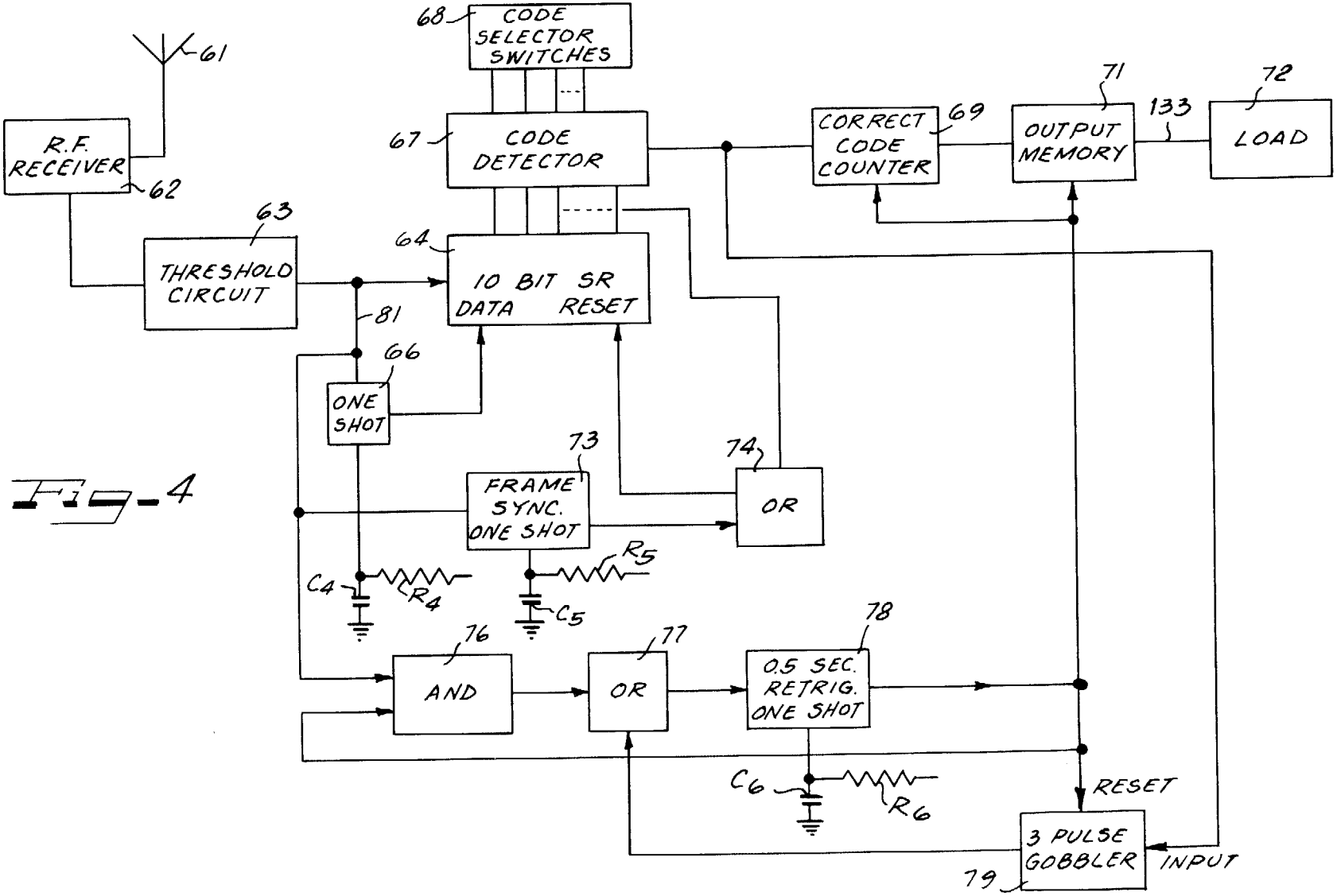
FIG. 4 is a block diagram of the receiver of the invention.
Figure 5:
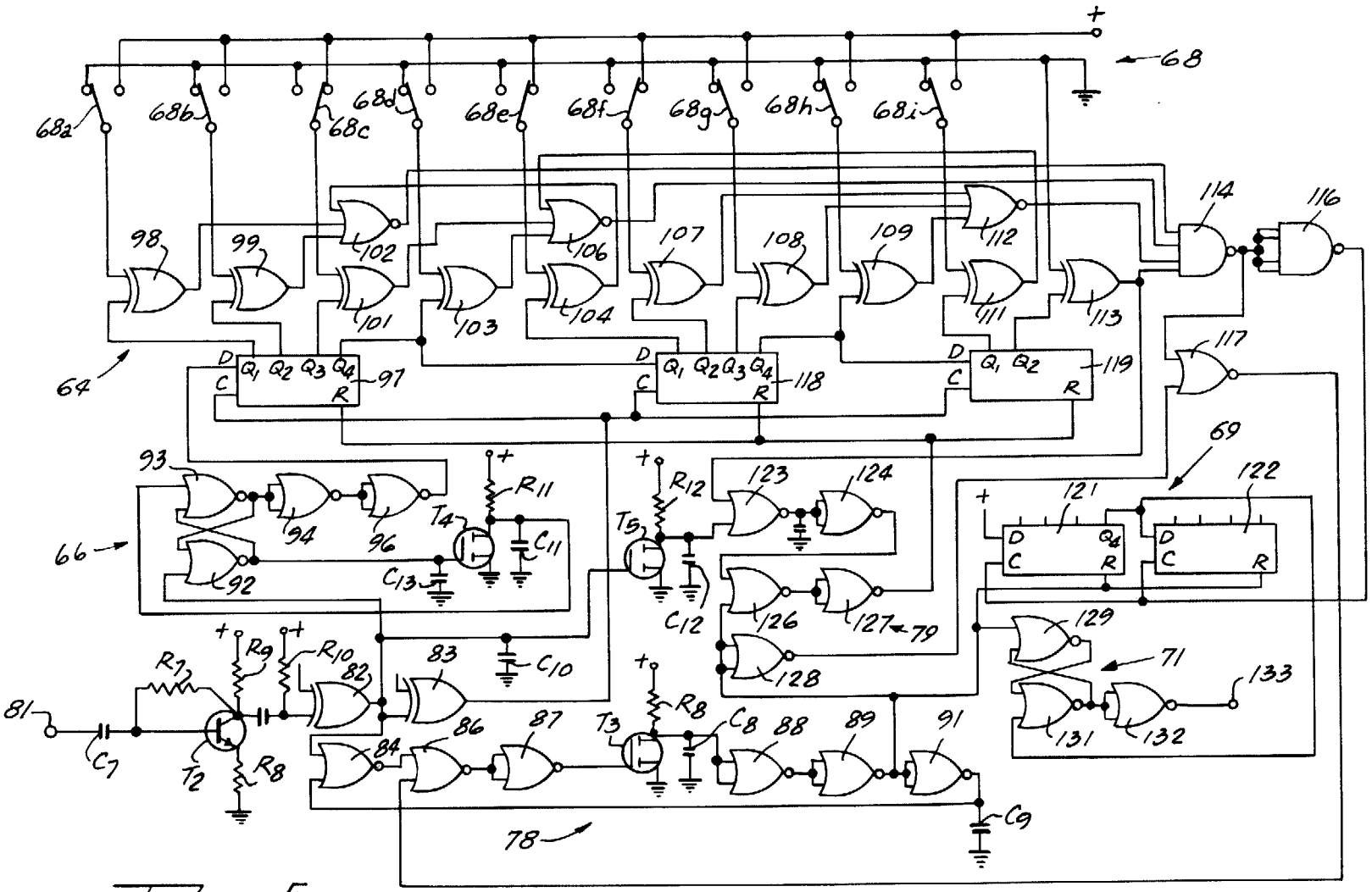
FIG. 5 is a block diagram of the receiver decoder.

FIGS. 4 and 5 illustrate the receiver including the decoder operation of the invention. An antenna 61 receives the signal from the transmitter and supplies it to a radio frequency receiver 62 which supplies an output through a threshold circuit 63 to a 10-bit shift register 64. Incoming pulses from the output of the threshold circuit 63 triggers a one shot 66 which provides a 2ms output to the data input of the shift register 64. The register 64 is clocked on the trailing edge of the input pulse and a one or zero will be clocked into it depending on whether the 2ms data pulse is still present or not. The register fills up with the incoming data and parallel outputs from the shift register 64 are supplied to a code detector 67 which compares the received information in the shift register with the positions of the code selection switches 68 associated with a particular receiver. If the code in the shift register 64 is the same as the setting of the switches 68 an output is provided by the code detector 67 through a correct code counter 69 which supplies an output memory 71 if four correct codes are counted during four sequential inputs; and if so, an output is supplied on lead 133 to energize the load 72. An OR gate 74 receives an output from the code detector 67 and supplies an input to the shift register 64. A frame sync one shot 73 receives an output of the threshold circuit 63 and supplies an input to the OR gate 74. An AND gate 76 receives an input from the threshold circuit 63 and an input from a 0.5 second Retrig one shot 78. The AND gate 76 supplies an output to an OR gate 77 which also receives an input from a three pulse gobbler 79. The OR gate 77 supplies an input to the Retrig one shot 78. The Retrig one shot also supplies a reset input to the three pulse gobbler and also supplies reset inputs to the correct code counter 69 and the output memory 71. The three pulse gobbler also receives an input from the code detector.

FIG. 5 is a detail block diagram of the logic constructure of the receiver decoder.

The receiver decoder as illustrated in FIG. 5 consists of an input amplifier T2 which receives an input signal on terminal 81 through the condenser C7 from threshold circuit 63 illustrated in FIG. 4 which in turn receives an input from the RF receiver 62 and the antenna 61. The output of the amplifier T2 is supplied through an exclusive OR gate 82 to the one shot 66 comprising the NOR gates 92, 93, 94, and 96. The output of the NOR gate 96 is supplied to integrated circuit 97 which with integrated circuits 118 and 119 form the shift register of the device. The output of the exclusive OR gate 82 is also supplied to the exclusive OR gate 83 which supplies incoming data to the shift registers 97, 118, and 119. A plurality of comparator gates comprising exclusive OR gates 98, 99, 101, 103, 104, 107, 108, 109, and 111 and 113 and NAND gates 102, 106, and 112 receive inputs from the receiver code selector switches 68a–68i. A correct code counter comprises integrated circuits 121 and 122.

An incoming pulse at terminal 81 triggers 2ms one shot 92, 93, 94, and 96 which drives the register's data input. The register is clocked on the trailing edge of the input pulse and a one or zero will be clocked into it depending upon whether the 2ms data pulse is still present or not. The register fills up and a one in the last position enables the compare function of integrated circuits 93, 94, 96, 98, 99, 101, 102, 103, 104, 106, 107, 108, 109, 111, 112, and 113. The present of this last bit causes the register to be reset to zero through the integrated circuit comprising the NOR gates 123, 124, 126, 127, and 128. This enables the comparator to toggle the code counter comprising the integrated circuits 121 and 122 if the code was correct. Upon the reception of four correct codes in sequence, integrated circuits 121 and 122 set an R-S flip-flop comprising the NOR gates 129 and 131 to supply an output to the terminal 133 through NOR gate 132 which is connected to the load 72 shown in FIG. 4 to open the garage door or other load being actuated.

An incoming pulse will set a 0.5 second one shot composed of NOR gates 84, 86, 87, 88, 89, and 91. This allows a one-half second interval for correct codes to be received or the counter and the register will be reset. However, a correct code occurring within this interval will retrigger the one shot holding the window open for more code reception.

The last resetting function is provided by integrated circuit comprising the NOR gates 123, 124, 126, and 127. Incominhg pulses supplied from the exclusive OR gate 82 fire its associated field effect transistor T5 holding capacitor C10 discharged. An absence of pulses for about 20ms will allow capacitor C10 to charge to a gate threshold resetting the register. This action reinitiates the register and provides needed sync between code frames.

Integrated circuits are available on the market and in the circuitry of FIG. 2 the integrated circuits 18 and 22 may be type MC 14501. The integrated circuit 21 may be type MC 14510. The D flops 27–37 may be MC 14013 and the NOR gates may be MC 14001. In FIG. 5 the exclusive OR devices 82, 83, 98, 99, 101, 103, 104, 107, 108, 109, 111, 113 may be integrated circuits MC 14507. The NOR gates 102, 106, and 112 may be integrated circuits MC 14025. The integrated circuits 97, 118, 119, 121, and 122 may be type MC 14015. The NAND gates 114 and 116 may be type MC 14012. The NOR gates 123, 124, 126, 127, 84, 86, 87, 88, 89, and 91, 129, 131, 132, and 117 may be type MC 14001. Transistor T2 may be type MPS 6571. Field effect transistors T3, T4, and T5 may be type 3N 170.

In operation, the code selector switches 14 and 68 in the transmitter and receiver are set to the same binary combination, as for example, in the particular example the movable contacts 14c and 14e and 14f are connected to ground and the corresponding code selector switches 68c, 68e and 68f in the receiver are connected to ground. The transmitter and receiver are, of course, at the same RF frequency. The transmitter is keyed on to transmit in sequence the binary code with the ones and zeroes having different time length pulses as illustrated in FIG. 3C. The receiver receives the transmitted pulses and supplies them through the transistor T1 through the one shot and to the 10 bit shift register wherein the incoming code is then compared with the setting of the switches 68a–i. If the setting is the same as the switches 14a–i, the correct code counter 121 and 122 will receive an input from the NAND gate 116; and upon the reception of four sequences of code, output will be supplied to terminal 133 thus keying the load. The load may, for example, be a garage door actuator which can be opened or closed with the transmitter and receiver.

Digital coding of radio controls in the invention is accomplished by transmitting a series of pulses called a pulse train in which each pulse can have one of two lengths dependent on the position of a single pole switch. The number of available codes depends on the number of switches. Since there are two distinct pulse widths the formula for the number of codes is $2^n$ where n is the number of switches, for seven switches $2^n$ is 128, eight switches 256, nine switches 512 etc.

The system is capable of 128,256 or 512 digital codes multiplied by the number of RF channels, which for 11 channels and 512 digital codes would be 512 times 11 RF channels to obtain 5832 useable codes. The means of changing codes by the user requires no test equipment and needs to only set the switches in both receiver and transmitter. In the event a transmitter or receiver had to be replaced they would only need returning to the RF channel if different and the digital code could be quickly set and only one model receiver and transmitter would have to be stocked.

The security of a 9 bit pulse train is excellent but the use of additional requirements such a four correct pulse trains within 0.5 seconds makes phantom operation virtually nonexistent.

It is to be realized that the gates 98–114 comprise a comparison means for comparing the incoming data in the shift register integrated circuits 97, 118 and 119 with the setting of the switches 68a–68i. For example, the exclusive OR gate 98 compares the input from switch 68a with the input in shift register 97 and supplies an input to NOR gate 102. NOR gate 102 also receives inputs from exclusive OR gates 99 and 104. These OR gates compare the positions of switches 68b and 68e with the data in the shift registers 97 and 118. Thus, the data in the shift register is compared with the data set by the switches and if they are the same an output is supplied through gates 114 and 117 to the code counter comprising circuits 121 and 122.

Although the invention has been described with respect to the preferred embodiments, it is not to be so limited as changes and modifications may be made which within the full intended scope as defined by the appended claims.

I claim as my invention:

1. A coding system for a transmitter and receiver so that a selected receiver will respond to a particular transmitter comprising a transmitter capable of transmitting a RF signal in a binary code having pulses having time lengths T1 and T2 of different times, means at said transmitter for setting said binary code to a selected combination, a receiver tuned to said RF signal, and including code comparing means receiving the incoming binary code, means at said receiver for setting a binary code to a selected combination supplying an input to said code comparing means, output means actuated by said comparing means if said means for setting a binary code at the transmitter and receiver are set to the same code combination, wherein said means at said transmitter for setting said binary code includes a plurality of two position switches, a shift register connected to said plurality of two position switches, an oscillator to drive said shift register, divider means connected to said oscillator and to said shift register to reset it, a two pulse length generator connnected to said shift register and to said dividers to produce said binary code and a RF oscillator connected to said two pulse generator and keyed thereby to cause it to radiate said binary code.

2. A coding system according to claim 1 including means to cause said transmitter to transmit said binary code signal a number of times with a time interval between succeeding transmissions including a switch connected for keying said RF oscillator.

3. A coding system according to claim 1 wherein said means at said receiver for setting a binary code comprises a plurality of two position switches.

4. A code system according to claim 3 including a threshold circuit connected to the input of said code comparing means and passing only signals which exceed a preset amplitude.

5. A coding system according to claim 3 wherein said code comparing means comprises a shift register into which received incoming code signals are supplied and a plurality of gates receiving inputs from said shift register and said two position switches to produce an output when said incoming code signals are the same as the code set by said two position switches.

6. A coding system according to claim 5 comprising means for resetting said shift register so as to receive incoming signals.

7. A coding system according to claim 6 including a correct code counter and memory circuit receiving the outputs of said plurality of gates and recording the number of correct incoming sequential signals and connected to said output means to energize it.

8. A coding system according to claim 7 including timing means connected to said correct code counter and memory circuit to reset it to zero at discrete time intervals.

*9. A coding system for a transmitter and receiver so that a selected receiver will respond to a particular transmitter comprising a transmitter capable of transmitting a RF signal in a binary code having pulses, means at said transmitter for setting said binary code to a selected combination, a receiver tuned to said RF signal, and including code comparing means receiving the incoming binary code, means at said receiver for setting a binary code to a selected combination supplying an input to said code comparing means, output means actuated by said comparing means if said means for setting a binary code at the transmitter and receiver are set to the same code combination, wherein said means at said transmitter for setting said binary code include n number of two position switches to produce $2^n$ possible codes, a shift register connected to said plurality of two position switches, an oscillator to drive said shift register, divider means connected to said oscillator and to said shift register to reset it, a pulse generator connected to said shift register and to said dividers to produce said binary code and a RF oscillator connected to said pulse generator and keyed thereby to cause it to radiate said binary code and wherein said means at said receiver for setting a binary code includes second n number of two position switches to produce $2^n$ possible codes.*

* * * * *